United States Patent [19]

Bonnett

[11] 4,270,115
[45] May 26, 1981

[54] ADAPTER FOR ADAPTING SIGNAL LAMP SYSTEMS OF TOWED AND TOWING VEHICLES

[76] Inventor: Robert N. Bonnett, 481 Yorkshire Dr., Severna Park, Md. 21146

[21] Appl. No.: 969,864

[22] Filed: Dec. 15, 1978

[51] Int. Cl.³ .................... B60Q 1/46; H01R 11/00
[52] U.S. Cl. ............................ 340/67; 340/81 R; 339/28; 307/10 R
[58] Field of Search ............ 339/18 P, 28; 307/10 R; 340/67, 81 R

[56] References Cited

U.S. PATENT DOCUMENTS

| | | | |
|---|---|---|---|
| 2,660,679 | 11/1953 | Hunt | 339/18 P |
| 2,994,001 | 7/1961 | Moorhead, Jr. | 307/10 R |
| 3,350,684 | 10/1967 | Turner | 340/67 |
| 3,849,664 | 11/1974 | Bryant | 340/67 |
| 4,005,313 | 1/1977 | Tibbits | 307/10 R |
| 4,057,310 | 11/1977 | Young | 339/28 |
| 4,064,413 | 12/1977 | Anderson | 340/81 R |

Primary Examiner—Donald J. Yusko
Attorney, Agent, or Firm—Scrivener, Clarke, Scrivener and Johnson

[57] ABSTRACT

An adapter is disclosed which is particularly suited to adapting a four wire signal lamp system as provided on many foreign automotive vehicles to the three wire system utilized on many American vehicles. The adapter is arranged to convert the normally common circuit of brake lamps of the four wire towed vehicle into two independent circuits utilizing in situ wiring of a turn lamp for one of the brake lamp circuits while disconnecting the two brake lamps from each other. The resulting independent brake lamp circuits are then connected to the independent combined turn and brake lamp circuits of the towing vehicle.

4 Claims, 1 Drawing Figure

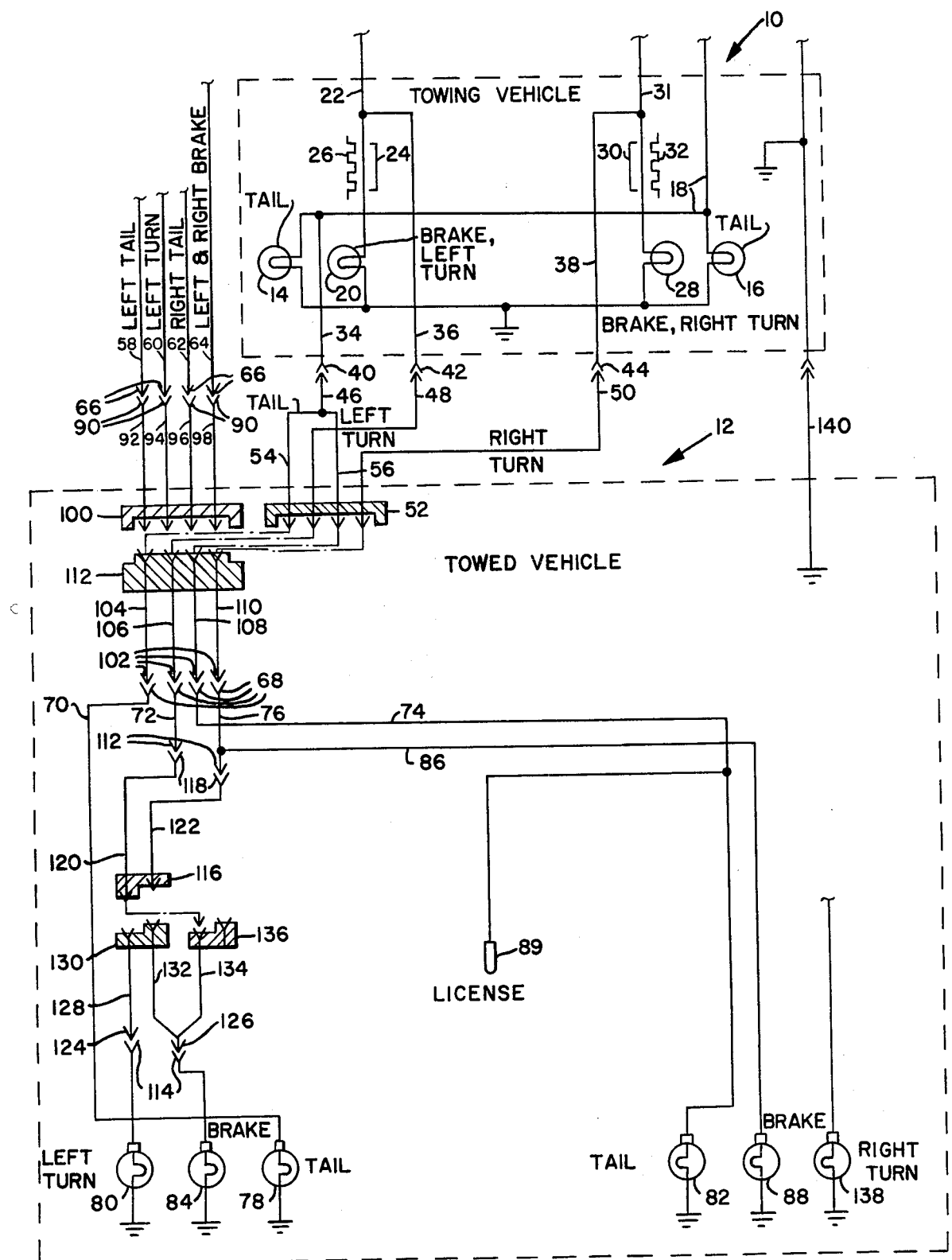

ADAPTER FOR ADAPTING SIGNAL LAMP SYSTEMS OF TOWED AND TOWING VEHICLES

This invention relates to adapters for adapting the signal lamps of a four wire towed vehicle whereby the turn, brake and tail lamp signals of the towed vehicle match identically the corresponding signals of the towing vehicle.

It is well known that most American automotive vehicles utilize a so called "three wire" signal lamp system incorporating left and right interconnected tail lights and separate left and right combined turn and brake lights.

In the "four wire" system, which is the system used in many foreign automotive vehicles, the left and right tail lamps are separate from each other, the turn lamps are separate from each other and from the brake lamps, and the latter are connected together.

From the foregoing description of the two systems, it can be seen that they are remarkably disparate and heretofore when a three wire towing vehicle has had to tow a four wire vehicle it has been difficult to interconnect the two systems so that the respective turn, brake and tail lamp signals of the towed vehicle match identically the signals of the towing vehicle.

The broad object of present invention is to provide extremely simple means for connecting the two different types of circuitry together without the necessity of splicing wires together or adding new wiring.

Broadly, the invention involves the use of first plug and socket means wherein the three wire system is plugged into the four wire system and second plug and socket means are employed for disconnecting the wiring leading to one of the turn signals and utilizing that wiring to lead from the first plug and socket means to one of the rear brake lights which is connected by the first plug and socket means into the circuit of the corresponding combined turn and brake lamps of the towing vehicle. The second plug means also serves to disconnect the other brake lamp of the towing vehicle from the first brake lamp and the other brake lamp is connected by means of the first plug and socket means into the circuit of the other combined turn and brake lamps of the towing vehicle. The first plug and socket means also serves to interconnect the two normally separate tail lamps of the towed vehicle into the circuit interconnecting the two tail lamps of the towing vehicle.

The invention will be better understood with reference to the single FIGURE illustrating an overall schematic electrical diagram of an interconnected system.

With reference to the drawing the numeral 10 designates the circuit and lamp arrangement for a towing vehicle having a typical "three wire" system as used on many American motor vehicles. The numeral 12 designates the circuit and lamp arrangement of a towed vehicle having a typical "four wire" system as used on many foreign vehicles, the particular arrangement shown being that utilized in certain of the Volkswagen Beatles.

Returning now to the three wire circuitry 10 of the towing vehicle, it will be observed that the left and right tail lamps 14, 16 are connected together by common wiring 18 leading to the vehicle power source. The towing vehicle has a left combined turn and brake lamp 20 connected by wiring 22 to the power source through a brake light switch (not shown) and a flasher switch (not shown) both well known in the art. When the brake is applied, the brake light switch is closed to produce a continuous braking signal 24. If, at the same time, the left turn signal control is operated, the flasher switch takes control to produce a pulsating signal 26 to indicate an impending left turn. The towing vehicle has an identical right combined turn and brake lamp 28 which is illuminated by a continuous braking signal 30 applied to wiring 31 simultaneously with the signal applied to lamp 20 whenever the brake is applied, and a pulsating signal 32 is applied to the lamp 28 whenever the right turn signal control is operated.

For purposes of connecting the towing vehicle circuitry to the circuitry of a towed vehicle, there is spliced into the tail light wiring 18 an electrical lead 34, into the wiring 22 of the left combined brake and left turn lamp a lead 36, and into the wiring 31 of the right combined brake and right turn lamp a lead 38. These leads may terminate in a common three pole plug or socket engageable with a mating three pole plug or socket represented by the three mating connectors 40, 42 and 44 shown. When not in use the plug or socket connected into the lamp circuitry of the towing vehicle rides in the rear, e.g., in the trunk, of the towing vehicle.

The mating three pole plug or socket represented by the other halves of the connectors 40, 42, 44 are connected by leads 46, 48, 50 to a four pole plug 52 which could as readily be a socket. The lead 46 is divided into two parallel leads 54, 56 with each lead receiving the identical signal transmitted to the tail lamps 14, 16 of the towing vehicle. The leads 48 and 50 receive the identical brake and turn signals transmitted to the respective left and right combined turn and brake lamps 20, 28.

Referring now to the circuitry of the towed vehicle, it will be understood that the wires labeled at the upper left of the FIGURE "right turn" "left tail", "left turn", "right tail", and "left and right brake" 58, 60, 62, 64 respectively, are connected to the fuse box (not shown) and power source 65 through individual connector halves 66 which are normally connected to mating connector halves 68 connected to wires 70, 72, 74, 76 normally leading to the left tail lamp 78, the left turn lamp 80, the right tail 82 and the left brake lamp 84, respectively. The wire 76 normally leading to the left brake lamp is also connected by the wire 86 to the right brake lamp 88 and connected to the wire 86 is the license plate illumination lamp 89. In the case of Volkswagen Beatles, the normally joined connector halves 66, 68 are located in the front luggage compartment with the wiring being color coded and identified from an instruction manual, but if there is doubt the proper wiring can be identified by a needle-light probe.

In accordance with the invention, a vehicle to be towed is prepared for towing by disconnecting the connector halves 66 from the halves 68 and connecting the former to halves 90 connected by leads 92, 94, 96, 98 to a four pole plug 100. In like manner the connector halves 68 are mated with connector halves 102 joined by leads 104, 106, 108, 110 to a four pole socket 112 mating with the four pole plug 100.

From the foregoing, it will be apparent that when the plug and socket 100, 112 are connected into the circuitry and to each other, the integrity of the circuits leading to the respective lamps is unchanged.

It should be clear from the description so far that the plug 52 can be substituted for the plug 100 in the socket 112. To avoid confusing the plugs 52, 100 when the towed vehicle is connected through a conventional tow bar to the towing vehicle it is highly desirable that the plug 100 be marked "normal" and the plug 52 "towing, " or words to like effect, to ensure that the proper plug is always connected to the socket 112.

Volkswagen Beatles also have in the rear engine compartment a series of connectors leading to the various lamps, such connectors facilitating rewiring in the event that an entire fender with its attached lamps has to be replaced. Only two sets of normally mating connectors 112, 114 are shown since it is only these two sets which must be disconnected to permit the connection of a plug member 116 by means of connector halves 118 and leads 120, 122 to the wires 72, 76 normally leading to the left turn lamp 80 and the left brake lamp 84, respectively. Connected to the connector halves 114 are connector halves 124, 126. The connector half 124 is connected by wire 128 to one pole of a double pole socket 130 and the half 126 is connected by one wire 132 to the other pole of the double pole socket 130. The half 126 is also connected by a wire 134 to one pole of a second double pole socket 136 whose other pole outlet is blanked off. The socket 130 should be marked "normal" and the socket 136 "towing," or words of like effect.

From the foregoing description it should be apparent that when the "normal" four pole plug 100 is plugged into the socket 112 and the two pole plug 116 is plugged into the "normal" two pole socket 130, the integrity of the entire signal lamp system of the towed vehicle is intact and the vehicle may be driven and the signal lights operated exactly as if the plugs and sockets did not exist.

Now when it is desired to interconnect the system of the towed and towing vehicles after the vehicles have been connected together by the usual tow bar, a harness having a three pole plug is connected to the socket member represented by the connectors 40, 42 44 in the rear of the towing vehicle. At the other end of the harness is the four pole plug 52 which is plugged into the socket 112 on the towed vehicle after disconnection of the "normal" four pole plug 100. Thereafter, the operator disconnects the "normal" socket 130 at the rear of the vehicle, if it is a Volkswagen Beatle, and plugs the plug 116 into the "towing" socket 136.

Unplugging the plug 116 from socket 130 and plugging plug 116 into socket 136 disconnects from the left turn lamp the wires 106, 72 and 120 normally leading through the plug and socket 116, 130 and wire 128 to the left turn lamp 80. When the plug 116 is plugged into socket 136 the wires 106, 72, 120 are now connected to the left brake light 84 by way of wire 134 and connectors 126, 114. When one follows the wire 106 now leading to the left brake light 84 through the four pole socket 100 and plug 52, he will abserve that the wire 106 is connected to wires 48, 36 leading to the circuit 22 for the left combined brake and turn lamp 20 of the towing vehicle. Thus when the lamp 20 is energized on the towing vehicle then so is the left brake lamp 84 of the towed vehicle, with the latter pulsating or being continuous identically with the lamp 20 on the towing vehicle.

Normally the left and right brake lamps 84 and 88 of the towed vehicle are connected together by the wires 86, 122, the plug and socket 116, 130 and wire 132. When the plug 116 is connected to the "towing" socket 136 the wire 122 is connected to the blanked off pole of the socket 136 and thus the two brake lamps are disconnected from each other when the plugs and sockets are in their towing configuration. However, when one follows the wire 86 leading to the right brake lamp 88, he will observe that it is connected by wires 76, 110, socket 112, and plug 52 with wire 50 which is connected through connector 44 with wire 38 leading to the circuit 31 for the right combined turn and brake lamp 28 of the towing vehicle. Thus right brake lamp 88 of the towed vehicle will operate in unison with and in the identical mode as the lamp 28 on the towing vehicle.

Though normally the two tail lamps 78, 82 are not connected to each other in the typical four wire system, it will be observed that when the "towing" plug 52 is connected to the socket 112 that the wire 74 leading to the right tail lamp 82 and wire 70 leading to the left tail lamp 78 are connected together through the socket 112 and plug 52 by means of the leads 54, 56 which are joined to the common lead 46 connected through the connector 40 to the wire 34 to the common circuit for both tail lamps 14, 16 of the towing vehicle. Thus the tail lamps of the towed vehicle are energized by the same common circuit which energizes the tail lamps of the towing vehicle.

Heretofore, the right turn lamp 138 of the towed vehicle has not been mentioned. Actually neither the left nor the right turn lamps of the towed vehicle are adapted by the invention to any use whatever when the wiring is connected through the plugs and sockets in towing configuration. The left turn lamp 80 is significant to the invention only in that it supplies in situ wiring leading through the vehicle which may be adapted to converting the left brake lamp 84 into a combined turn and brake lamp, thus eliminating any need to provide additional wiring merely for the purpose of connecting the left brake lamp 84 to the appropriate socket of the four pole socket 112. It should be appreciated that it is the in situ wire 72, which due to drafting limitations is shown relatively short but is in fact a long wire, which is threaded through the vehicle body at the time of manufacture and it is this wire which the invention makes use of in converting the normally non-pulsating brake lamp 84 of the towed vehicle into a combined continuous brake lamp and/or pulsating turn signal lamp. It should be further noted that no attempt is made to convert the turn signal lamps of the towed vehicle into brake lamps because of the fact that the turn signals in four wire vehicles are usually amber whereas brake lights are customarily red in both three and four wire vehicles.

When connected together for towing the two vehicles are grounded together as by a suitable grounding wire 140.

From the foregoing description, it should be apparent that the four pole plug 52 and two pole plug 136 have essentially converted the four-wire system of the towed vehicle to a three wire system compatible with the three wire system of the towing vehicle. The invention contemplates the provision of the adapter components in kit form consisting of the four pole socket 112 and the four pole plugs 100, 52 and the two pole plug 116 and two pole sockets 130, 136 with the described leads or wires and connector halves joined to the plugs and sockets for ready installation into the system of the towed vehicle with a minimum need for any tools, except possibly needle-nose pliers to assist in connecting the connector halves, and a needle-light probe should the color code for the wires on the towed vehicle not correspond to those described in the service manual. The kit is readily adaptable to use with a towed vehicle having a three wire system and under those circumstances the two pole plugs are not required and only three of the four wires of the four pole socket and plugs are utilized.

Though the invention has been described primarily as it would be utilized with a four wire system of a towed Volkswagen Beatle, it will be understood that the identical principals apply to any four wire system which is to be connected to a three wire system, it being only necessary to determine from a service manual for the vehicle where the wires and connectors are located.

Where components have been identified as plugs they could as readily be sockets and vice versa. Instead of one component being solely a socket or a plug it could be combined socket or plug of the type where a single plug, say, of a four pole unit is utilized to ensure proper matching of the poles. For convenience, the claims recite plugs and sockets to conform with the drawings. It should be expressly understood, however, that where "socket" or "plug" is used in the claims, these words are to be construed as reading on either a socket or plug or combined plug-sockets. Those skilled in the art will recognize that in lieu of the four pole and two pole plug and socket members, four pole and two pole, double throw switches or a combination of a switch and plug could be employed.

It will be apparent that the invention is susceptible not only to the changes specifically mentioned but to a variety of other changes and modifications without, however, departing from the scope and spirit of the appended claims.

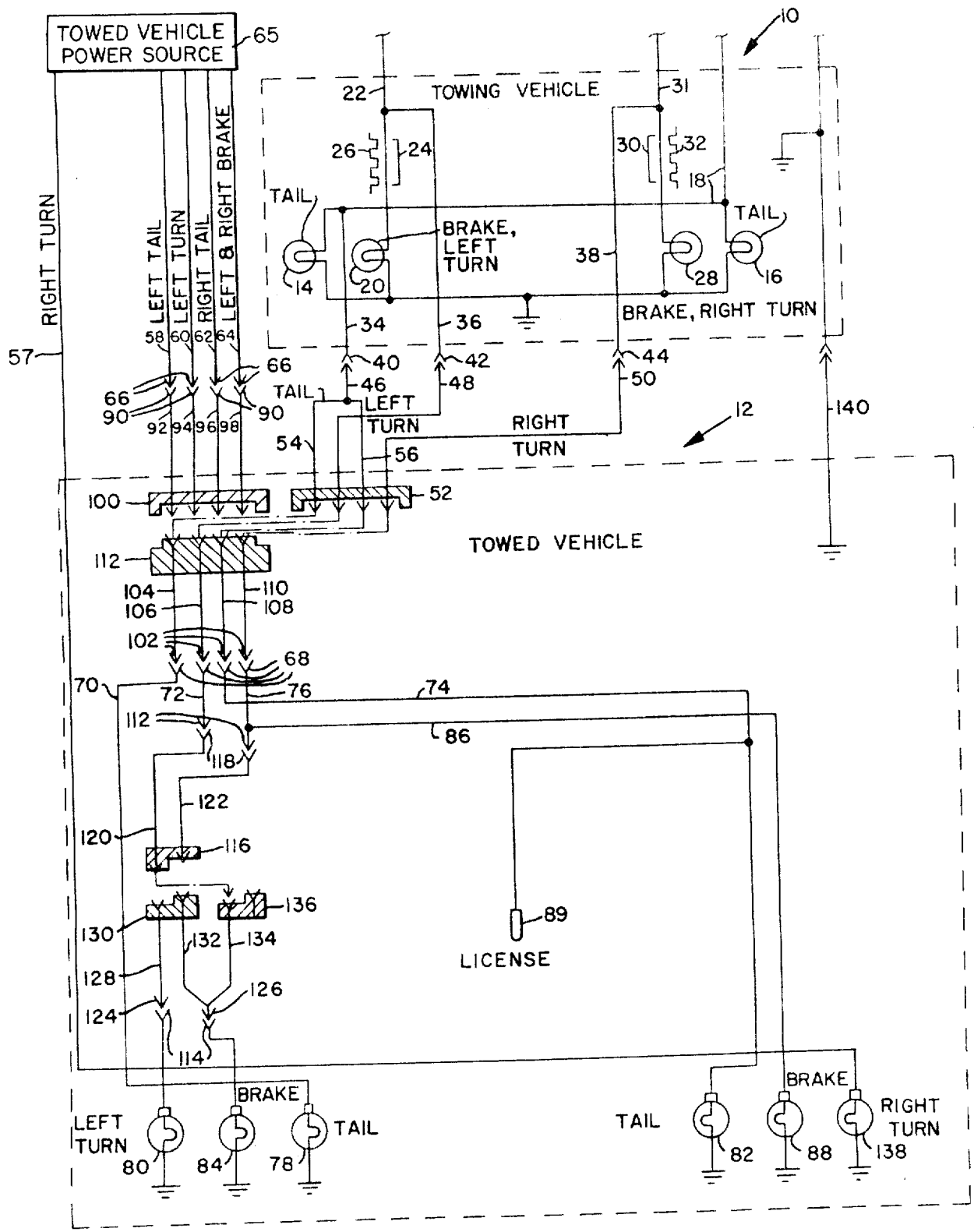

What is claimed is:

1. An adapter for adapting lamps of a four wire lamp system of a towed vehicle to lamps of a three wire lamp system of a towing vehicle, the four wire system including first and second turn lamps and first and second brake lamps, the first and second lamps being on opposite sides of the towed vehicle, an electrical lead normally extending from the power source on the towed vehicle to the first turn signal lamp, a pair of normally interconnected electrical leads normally extending from the power source on the towed vehicle to the respective first and second brake lamps, the three wire system including first and second combined turn and brake lamps on opposite sides of the towing vehicle corresponding to the location of the first and second lamps on the towed vehicle, said adapter comprising means for disconnecting from the power source on the towed vehicle the lead connected to one of the first and second turn lamps and also the interconnected pair of leads to the first and second brake lamps, means for disconnecting from said one turn lamp the lead normally connecting same to the power source and connecting said lead to one of the brake lamps, means for disconnecting one of said pair of normally interconnected leads from the said one of said brake lamps, means for connecting the former turn lamp lead following connection thereof to the first brake lamp of the towed vehicle to the first combined brake and turn lamp of the towing vehicle, and means for connecting the remaining one of the pair of normally interconnected leads connected to the second brake lamp of the towed vehicle to the second combined brake and turn lamp of the towing vehicle, whereby the former brake lamps of the towed vehicle are converted into combined turn and brake lamps operable in unison with the corresponding lamps on the towing vehicle.

2. The adapter of claim 1 wherein the four wire system of the towed vehicle includes, in addition, first and second tail lamps on opposite sides of the towed vehicle corresponding to the first and second turn and brake lamps, first and second leads normally extending from the power source on the towed vehicle to the first and second tail lamps, the three wire system of the towing vehicle including interconnecting first and second tail lamps, said adapter including means for disconnecting the leads of the first and second tail lamps from the power source, and means for connecting each of said last mentioned leads to the interconnected tail lamps of the towing vehicle.

3. The adapter of claim 2 wherein the means for disconnecting the leads on the towed vehicle from the source and connecting the same to the lamps on the towing vehicle comprise four pole plug and socket members.

4. The adapter of claim 2 wherein the means for disconnecting the leads from the first turn lamp and the first brake lamp while connecting the lead from the first turn lamp to the first brake lamp comprise two pole plug and socket members.

* * * * *

UNITED STATES PATENT AND TRADEMARK OFFICE
CERTIFICATE OF CORRECTION

PATENT NO. : 4,270,115
DATED : May 26, 1981
INVENTOR(S) : Robert N. Bonnett

It is certified that error appears in the above—identified patent and that said Letters Patent is hereby corrected as shown below:

On The Title Page, the Drawing Figure and the Sheet of Drawing should appear as shown on the attached sheet.

Signed and Sealed this

Twenty-second Day of September 1981

[SEAL]

Attest:

Attesting Officer

GERALD J. MOSSINGHOFF
Commissioner of Patents and Trademarks